US007886042B2

(12) United States Patent
Larsson et al.

(10) Patent No.: US 7,886,042 B2
(45) Date of Patent: *Feb. 8, 2011

(54) DYNAMICALLY CONSTRAINED, FORWARD SCHEDULING OVER UNCERTAIN WORKLOADS

(75) Inventors: Daniel Mattias Larsson, San Jose, CA (US); Ashwinder Ahluwalia, Union City, CA (US); Sridharan Gopal Krishnan, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 11/642,176

(22) Filed: Dec. 19, 2006

(65) Prior Publication Data

US 2008/0147616 A1 Jun. 19, 2008

(51) Int. Cl.
G06F 15/173 (2006.01)
G06F 7/00 (2006.01)
G06F 17/30 (2006.01)

(52) U.S. Cl. .................. 709/224; 709/225; 709/226; 707/706; 707/709; 707/711

(58) Field of Classification Search ......... 709/224–226; 707/705–712; 370/412–418
See application file for complete search history.

(56) References Cited

U.S. PATENT DOCUMENTS 6,321,265 B1 * 11/2001 Najork et al. ............... 709/224
6,983,236 B1 * 1/2006 Karlovac et al. ............ 703/22
7,305,610 B1 * 12/2007 Dean et al. .................. 715/205
2004/0225644 A1 * 11/2004 Squillante et al. ............ 707/3
2005/0192936 A1 * 9/2005 Meek et al. ................... 707/3

FOREIGN PATENT DOCUMENTS

WO WO-0075802 A1 * 12/2000

OTHER PUBLICATIONS

U.S. Appl. No. 12/269,879, filed Nov. 12, 2008, Notice of Publication, Mar. 19, 2009.

* cited by examiner

*Primary Examiner*—William C Vaughn, Jr.
*Assistant Examiner*—Carlos R Perez Toro
(74) *Attorney, Agent, or Firm*—Hickman Palermo Truong & Becker LLP (57) ABSTRACT

Scheduling searchable items such as web pages for crawling involves dynamically scheduling items for downloading based on capacity based on time. The workload is distributed over time, in advance, by anticipating and accounting for the discovery of new links on the particular host. Respective times to download items can be determined based on the current size of the host's crawl corpus relative to the maximum size of the host's crawl corpus. The respective times may be determined based additionally on respective freshness targets for the searchable items, which characterize how often an item's content should be refreshed by re-downloading the item, and on respective politeness factors for the host, which characterize the delay time between consecutive download requests to that host. As such, one can know precisely how the system is performing at any point in time and predict future performance.

34 Claims, 6 Drawing Sheets

| Statistics | Administration |
|---|---|

| Overview | Frontier | Report | URI |

| Frontier Class | mercator.vespa.frontier.VespaContentFrontier |
|---|---|
| Throttled | true |
| Number of Active Queues | 954 |
| Frontier Size | 3822 |

*Click on column header to sort by that column (relative size not sortable)*

| Name | Size | Relative Size | Estimated Seconds Per Download | Total Url Count |
|---|---|---|---|---|
| http://in.movies.yahoo.com | 2 | | 17.0 | 300 |
| http://de.lifestyle.yahoo.com | 6 | | 20.0 | 300 |
| http://ca.sports.yahoo.com | 1 | | 33.0 | 300 |
| http://messages.finance.yahoo.com | 3 | | 27.0 | 300 |
| http://tw.post.quiz.polls.yahoo.com | 1 | | 10.0 | 300 |
| http://au.dir.groups.yahoo.com | 1 | | 10.0 | 300 |
| http://sla1.ymon.mud.yahoo.com | 1 | | 11.0 | 2 |
| http://sbs.corp.yahoo.com | 1 | | 10.0 | 300 |
| http://netflow1.cnb.yahoo.com | 1 | | 10.0 | 2 |
| http://es.wap.yahoo.com | 3 | | 10.0 | 300 |
| http://search.hk.tech.yahoo.com | 1 | | 27.0 | 233 |
| http://newssearch.corp.yahoo.com | 1 | | 10.0 | 210 |
| http://search.fifaworldcup.yahoo.com | 1 | | 10.0 | 300 |
| http://tr.blog.360.yahoo.com | 1 | | 10.0 | 300 |
| http://dfm.corp.yahoo.com | 5 | | 24.0 | 300 |

*FIG. 3*

```
WHILE PERFORMING A WEB CRAWL, DETECT A HYPERLINK TO
A FIRST SEARCHABLE ITEM ON A PARTICULAR HOST
                        402
```

```
IN RESPONSE TO DETECTING THE HYPERLINK AND WHILE
PERFORMING THE WEB CRAWL, DETERMINE A TIME TO
DOWNLOAD THE FIRST SEARCHABLE ITEM BASED AT LEAST IN
PART ON (A) A NUMBER OF SEARCHABLE ITEMS ON THE
PARTICULAR HOST THAT ARE SCHEDULED FOR DOWNLOADING
AND (B) A FRESHNESS TARGET FOR THE FIRST SEARCHABLE
                        ITEM
                        404
```

```
WHILE PERFORMING THE WEB CRAWL, SCHEDULE THE FIRST
SEARCHABLE ITEM FOR DOWNLOADING BASED ON THE
                DETERMINED TIME
                      406
```

```
DOWNLOAD THE FIRST SEARCHABLE ITEM AT THE
              DETERMINED TIME
                    408
```

```
DETERMINE A TIME TO RE-DOWNLOAD THE FIRST SEARCHABLE
ITEM BASED AT LEAST IN PART ON THE FRESHNESS TARGET
            FOR THE FIRST SEARCHABLE ITEM
                          410
```

```
SCHEDULE THE FIRST SEARCHABLE ITEM FOR DOWNLOADING
          BASED ON THE TIME TO RE-DOWNLOAD
                          412
```

DYNAMICALLY CONSTRAINED, FORWARD SCHEDULING OVER UNCERTAIN WORKLOADS

FIELD OF THE INVENTION

The present invention relates generally to workload management and, more specifically, to dynamically scheduling use of a resource in the context of an uncertain future workload.

BACKGROUND OF THE INVENTION

Search Engines

Through the use of the Internet and the World Wide Web ("the web"), individuals have access to billions of items of information. For example, the web provides access to items such as web pages, pictures, songs, videos, bookmark sets, white page listings, people, etc., generally and collectively referred to herein as "searchable items" or simply "items." However, a significant drawback with using the web is that, because there is so little organization to the web, at times it can be extremely difficult for users to locate the particular items that contain the information that is of interest to them. To address this problem, a mechanism known as a "search engine" has been developed to index a large number of searchable items and to provide an interface that can be used to search the indexed information by entering certain words or phrases to be queried. These search terms are often referred to as "keywords". A search engine is a computer program designed to find searchable items stored in a computer system, such as the web or such as a user's desktop computer. The search engine's tasks typically include finding searchable items, analyzing such items, and building a search index that supports efficient retrieval of such items.

Indexes used by search engines are conceptually similar to the normal indexes that are typically found at the end of a book, in that both kinds of indexes comprise an ordered list of information accompanied with the location of the information. An "index word set" of a document is the set of words that are mapped to the document, in an index. For example, an index word set of a web page is the set of words that are mapped to the web page, in a search index. For items that are not indexed, the index word set is empty.

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate searchable items of information from around the world. Upon locating an item, the crawler stores the item's URL, and follows any hyperlinks associated with the item to locate other items. Second, each search engine contains information extraction and indexing mechanisms that extract and index certain information about the items that were located by the crawler. In the context of a web page, for example, index information is generated based on the contents of the HTML file associated with the web page. The indexing mechanism stores the index information in large databases that can typically hold an enormous amount of information. Third, each search engine provides a search tool that allows users, through a user interface, to search the databases in order to locate specific searchable items that contain information that is of interest to them, and their location on the web (e.g., a URL).

The search engine interface allows users to specify their search criteria (e.g., keywords) and, after performing a search, provides an interface for displaying the search results. Typically, the search engine orders the search results prior to presenting the search results to the user. The order usually takes the form of a "ranking", where the searchable item with the highest ranking is the item considered most likely to satisfy the interest reflected in the search criteria specified by the user. Once the matching searchable items have been determined, and the display order of those items has been determined, the search engine sends to the user that issued the search a "search results page" that presents information (e.g., URLs, titles, summaries, etc.) about the matching searchable items in the determined display order.

Shared Crawler Resources

Sharing a limited resource among multiple users, in an environment where resource availability is unknown and time of exploitation is the most important constraint, presents its challenges. A typical example of this problem can be found in the context of Internet content acquisition (e.g., web crawling) where each "user" is the uniform resource identifier of an instance of web content. Each content acquisition cycle takes a varying amount of time, which depends on external and unknown factors such as network latency and host performance as well as local constraints such as central processing unit cycles and random access memory availability. While traditionally this problem has been approached in the context of web crawlers by dividing the overall corpus into smaller and smaller corpora, for crawling each corpus using a respective set of unshared resources, and by expanding system resources in response to the corresponding corpus expanding, such approaches offer very little control over resource capacity and timing issues.

Web crawlers traditionally "gorge" themselves on newly discovered links by filling a download queue uncontrollably by simply placing new links at the end of the queue. Some crawlers may implement download priorities by sorting the links from the queue as the links are output from the queue. Hence, because the download scheduling process is substantially uncontrolled and every crawler system has limited resources, some of the links may never be crawled because they keep getting pushed to the bottom of the queue.

In order to be effective, use of shared resources in all contexts requires some form of management of and control over access to such resources. In the context of web crawlers, shared resources may be managed across the entire corpus of searchable items by creating multiple system clusters with different policies associated with each cluster of machines. For example, each crawler system is configured to crawl items having the same or similar refresh rates. However, such a system of systems is likely to be difficult to configure, expensive to maintain, and an inefficient use of resources. Another possible approach to achieving relatively quicker refresh of a subset of items is to simply associate the subset with a fixed scheduling priority and, therefore, reload an associated input file every X minutes as dictated in the priority policy. However, such a system is likely to be difficult to administer and inflexible in its approach to scheduling policies.

A Vertical Portal (also referred to as a "vortal" or simply as a "vertical") is a portal website that provides information and resources for a particular industry or topic. Verticals are the Internet's way of catering to consumers' focused-environment preferences, where verticals typically provide news, research and statistics, discussions, newsletters, online tools, and many other services that educate users about a specific industry or topic. Constructing a vertical requires topical crawling of the web in order to identify relevant content for a given vertical's topic, referred to as "vertical search". Vertical searches require fine-grained control over short-lived important content, such as link hubs, that must be re-acquired more frequently than non-hub content. In the context of vertical search, where the content acquisition process requires more precise control over the timing of each acquisition, the non-capacity controlled approach does not work well enough.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Definitions

The following definitions apply to terminology used herein.

A "web crawl" refers to the process performed by a web crawler, by which the web crawler system "crawls" across the Internet to locate and download searchable items of information (for a non-limiting example, web pages) and, upon locating such an item, stores the item's URL and hyperlinks contained within the item to locate other items.

A "freshness target" for a searchable item refers to how often a searchable item's content should be refreshed by downloading the item from the web, i.e., how "fresh" the item should be, for example, for purposes of a search engine.

"Politeness" refers to the concept of prohibiting web crawlers from issuing consecutive download requests to a particular host faster than a certain rate. Politeness is enacted, generally, to avoid inundating a host with crawl-related requests.

Functional Overview of Embodiments

Techniques for scheduling searchable items for crawling involves detecting a hyperlink to a searchable item on a particular host, while performing a crawl. As discussed, crawling the web, or topical portions of the web in the case of vertical search, involves locating and downloading searchable items and recording hyperlinks associated with the item. Once "new" links are discovered on a web page, for example, the searchable items located via the links need to be scheduled for downloading. Thus, rather than downloading all the new items right away after discovery, and rather than simply placing the new links at the end of a crawler download queue, the new items are dynamically scheduled for downloading based on, conceptually, capacity based on time. The workload is distributed over time, in advance, by anticipating and accounting for the discovery of new links on the particular host.

Hence, according to an embodiment, respective times to download searchable items are determined based in part on the number of searchable items on that host that are currently scheduled for downloading (i.e., the "current size" of the host's crawl corpus), relative to the maximum number of searchable items on that host that are to be scheduled for downloading (i.e., the "maximum size" of the host's crawl corpus). The respective times may be determined based additionally on respective freshness targets for the searchable items, where a freshness target characterizes how often a searchable item's content should be refreshed by downloading the item from the web, and on respective politeness factors for the host, where the politeness factor characterizes the minimum time between consecutive download requests to that host. Thus, a crawler download queue is constrained to a certain number of items for a given host and a running count of the number of scheduled items on that host is maintained, in order to schedule for download a given item on that host in view of the freshness target for that item and the politeness factor for that host.

Consequently, searchable items from a given host are not necessarily scheduled for download in the order that they are discovered, but are substantially evenly distributed over a timeline, perhaps in conjunction with items from other hosts, and in a manner that attempts to comply with host-related and item-related constraints. As such, one can know precisely how the system is performing at any point in time and predict future performance. If it is predicted, based on the schedule, that the host-related and item-related constraints can not be met using a certain set of resources, e.g., a particular system of machine(s) crawling a given corpus, then associated advisories can be issued to indicate that the system has insufficient processing capacity. This dramatically reduces support costs for the system because operators are able to quickly and efficiently detect issues with capacity or otherwise.

In the context of vertical searches, time is often the most important constraint because prices, fares, job listings, etc. (depending on the vertical) change daily, or even more frequently. Thus, vertical searchers typically prefer timing over comprehensiveness. Therefore, the techniques described herein are particularly suitable for and beneficial to vertical searches, although not limited to such.

Functional Operating Environment

Most web crawler administrators want to be able to configure crawlers by specifying a set of constraints on the crawler's behavior. Thus, crawlers can be configured to assign each searchable item to a scheduling class. Each scheduling class specifies the scheduling-related constraints for the searchable items assigned to that class, such as the freshness target for that class. Further, crawlers can be configured to assign politeness factors to hosts, as well as to assign a maximum number of items downloaded per host. Therefore, such constraints can be used to dynamically schedule for downloading searchable items from one or more hosts, in view of a crawler system's resource capacity based on time.

Figure 1:
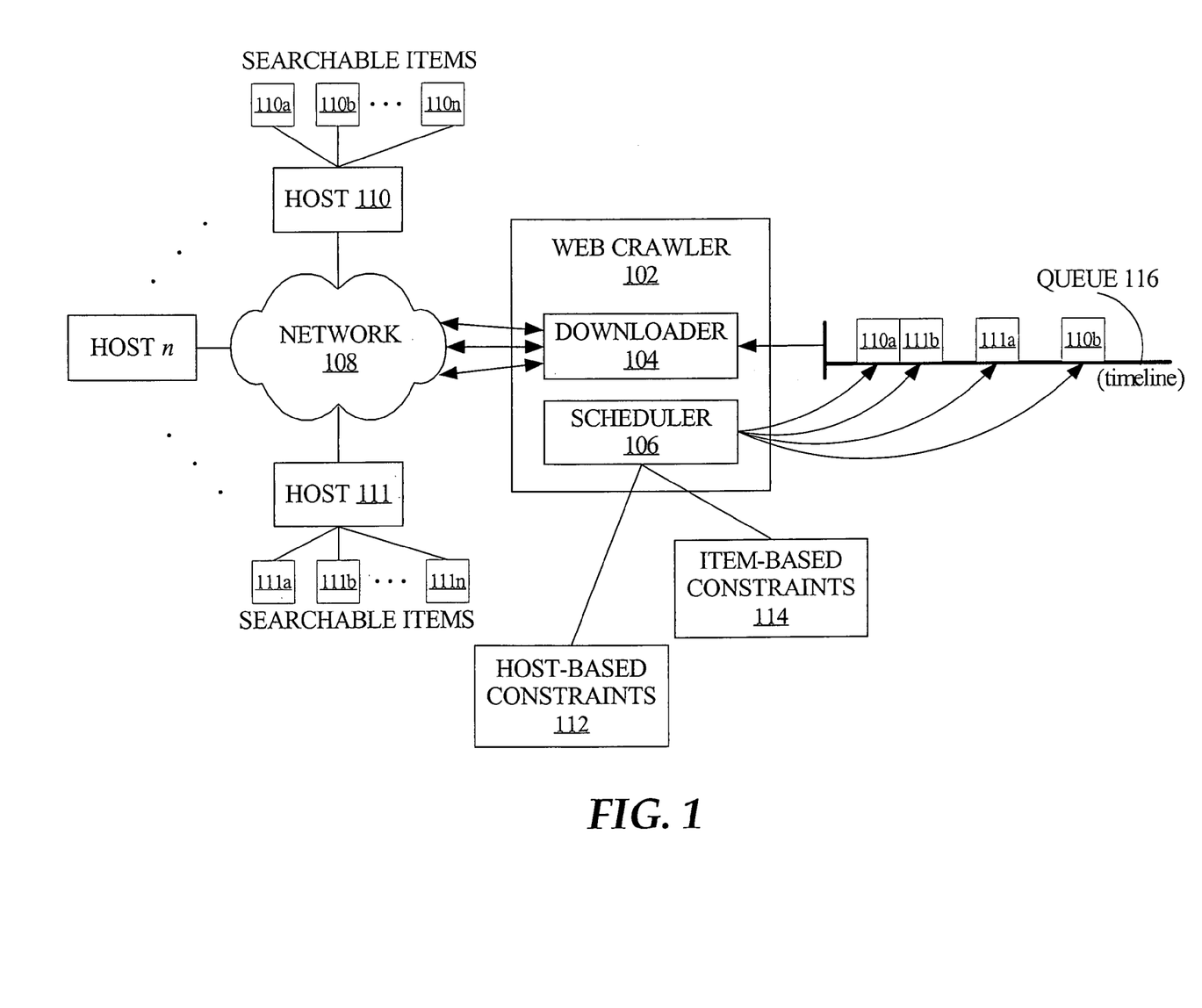
FIG. 1 is a block diagram that illustrates a functional operating environment, according to an embodiment of the invention.

FIG. 1 is a block diagram that illustrates a functional operating environment, according to an embodiment of the invention. FIG. 1 depicts a web crawler 102 comprising a downloader 104 and a scheduler 106 and connected to Internet 108, which is connected to hosts 110, 111, and n hosting searchable items 110a, 110b-110n and 111a, 111b-111n, host-based constraints 112 and item-based constraints 114, and a queue 116.

Web crawler 102 represents a web crawler which, as described herein, is a computer software system that "crawls" across the Internet to locate and download searchable items and, upon locating such an item, stores the item's URL and hyperlinks contained within the item to locate other items. Web crawler 102 is communicatively connected to a network 108, such as the Internet. Host 110, host 111, and host n are also communicatively connected to the network 108, such that web crawler 102 can request searchable items from each of the hosts. The number of hosts connected to the network 108 varies and, therefore, the hosts are depicted as host 110, host 111, and host n for convenience only. Thus, the number of hosts connected to the network 108 is not limited to three hosts or to n hosts or to any number of hosts. Host 110 is depicted as hosting searchable items 110a, 110b-110n and host 111 is depicted as hosting searchable items 111a, 111b-111n. Similarly, the number of searchable items hosted by hosts 110 and 111 varies and, therefore, the searchable items are depicted as they are in FIG. 1 for convenience. Thus, the number of searchable items hosted by host 110 and host 111 is not limited to three items or to n items or to any number of items. The searchable items depicted in FIG. 1 generally represent the corpus of searchable items that may be crawled by web crawler 102.

Web crawler 102 comprises a downloader 104 and a scheduler 106. Downloader 104 pulls download requests for searchable items (e.g., in the form of URIs, Uniform Resource Identifiers) from a crawler queue 116 in an order generated by scheduler 106, and uses the URIs to download corresponding searchable items via a network 108. According to one embodiment, the URIs in crawler queue 116 are segregated by host and placed in per-host queues. Thus, in such an embodiment, each thread of a multi-thread downloader 104 works on and completes one per-host queue at a time before moving to another per-host queue. However, while one thread is working on one per-host queue, other threads of downloader 104 work in parallel on other per-host queues. Consequently, while one thread may be waiting for a period of time to download another item from a particular host, i.e., due to the host politeness factor, other threads are still able to download items from other hosts and the crawler system as a whole is not idle.

Scheduler 106

After downloader 104 downloads searchable items, each item's embedded outbound links are extracted from the item content. Searchable items corresponding to the new links and the item just downloaded are scheduled, by the scheduler 106, to be downloaded at a future time. The shared resource that the scheduler 106 manages are the "download slots" available for all the hosts that a particular web crawler 102 system intends to crawl, in an attempt to maximize overall throughput while complying with and adhering to specified scheduling constraints, such as the politeness factor and the maximum number of downloads associated with each host and the freshness target associated with each searchable item. The resource being scheduled by scheduler 106 can be considered to have the following properties. Once a download slot is allocated to a URI, the slot can be held for an unknown time, where the download can take seconds or even minutes before completing. Meanwhile, no other URIs for that host can be downloaded because of politeness. Once a download is performed, scheduler 106 should wait for the politeness interval before the per-host slot becomes available again.

Hence, scheduler 106 implements host-based constraints 112 and item-based constraints 114 in a scheduling process, which determines where to place each item in download queue 116. Where each searchable item is placed in queue 116 reflects a relative time at which that searchable item is to be downloaded from the corresponding host 110, host 111-host n by downloader 104. How the set of searchable items from a given host are ordered in queue 116 reflects an order in which the searchable items are downloaded by a thread of downloader 104. Host-based constraints 112 include, but are not limited to, the politeness factor and the maximum number of downloads associated with each host. Item-based constraints 114 include, but are not limited to, the freshness target associated with each searchable item. Note that different searchable items hosted by a given host may be associated with different freshness targets. For example, in response to downloading a searchable item, a classifier (e.g., a machine-learned semantic classifier process) may classify the relative quality and importance of the item's content, perhaps with consideration to a particular topic in the case of a vertical search. Based on the resulting classification, a freshness target is generated for the downloaded item, which reflects the rate at which the web crawler 102 should refresh the item based at least in part on downloader 104 again downloading the item from its corresponding host. With newly discovered links whose corresponding searchable items have yet to be downloaded, a classifier may generate corresponding freshness targets based on the links' respective parent items, i.e., the freshness target for the searchable item in which the link is discovered. Further, a classifier may infer information from the outbound link itself, such as the link's anchor text, in order to generate a corresponding freshness target for the link.

According to an embodiment, for a newly discovered URI link, the scheduler 106 uses the current number of URIs scheduled for this host and the freshness target for this URI's scheduling class, to determine when a host download slot will be available and not in use by another URL for this host. Hence, scheduler 106 schedules the searchable item corresponding to this URI to be downloaded no earlier than the time at which the host download slot becomes available. According to one embodiment, for a newly discovered link, the scheduler 106 uses the politeness factor for this host to determine when a host download slot will be available for use. In this context, when a download slot is available for use is based on the slot being available for further use due to its politeness delay expiring, and not being scheduled for use by another URL for this host.

According to an embodiment, scheduler 106 schedules the searchable item corresponding to this URI to be downloaded at the time at which the host download slot becomes available. However, the time at which a given searchable item is scheduled for downloading could change, for example, in response to another new URI link being discovered that belongs to a different scheduling class having a sooner freshness target than the given searchable item. For example, a first searchable item, which is associated with a "1 day" freshness target, may be scheduled for download at the earliest available download slot for that host, e.g., in 11.5 hours. Subsequently, a second URI from the same host is discovered, which belongs to a different class having a "12 hour" freshness target. Thus, based in part on its more demanding freshness target, the item corresponding to the second URI may be scheduled for download at the earliest available download slot for that host, i.e., using the slot that was occupied by the first item and thereby pushing the first item back one or more slots.

According to an embodiment, for newly discovered URI links, the scheduler 106 also takes into account the maximum number of searchable items from a given host that are to be scheduled for downloading, which could be a user-configurable parameter, to determine when to schedule a new item for downloading. That is, the scheduler 106 takes into account the number of searchable items from that host that are already scheduled in proportion to the maximum number of searchable items from that host that are to be scheduled, i.e., how far along is the scheduler 106 in the scheduling process for a given host and, therefore, how many more slots may be needed for that host.

Because scheduler 106 utilizes an ongoing, dynamic scheduling process for a dynamic and uncertain workload, the scheduled download slots for a host's items may be continuously changing due to decreasing the uncertainty. The uncertainty may be decreased, for example, based on the knowledge imparted through discovering new links for that host as well as the number of searchable items from that host that are already scheduled in proportion to the maximum number of searchable items from that host that are to be scheduled. The result being that, over the time spent crawling a given host, searchable items for that host are distributed substantially uniformly over future time, while accounting for the various host-based constraints 112 and item-based constraints 114 that apply to each item and each item's host.

According to an embodiment, for newly discovered URI links, the scheduler 106 also uses an estimate of the corresponding host's processing speed to determine when a host download slot will be available. The host's processing capabilities can be used to estimate, on average, how long it might take to download an item from that host. Further, metrics about how long it has actually been taking to download items from a given host can be tracked, to maintain a running average which accounts for the variation in download times among items of different sizes from the same host, as well as other factors.

According to an embodiment, for URI links corresponding to searchable items that have already been downloaded, the scheduler uses the freshness target corresponding to that item to determine when the item should be refreshed, e.g., downloaded again for information extraction, classification, and keyword indexing purposes. According to embodiments, one or more other factors are taken into account in scheduling old links to be refreshed, such as other host properties (or estimates of them), including one or more of the host speed, the host maximum size, and the host politeness factor.

Figure 2A:
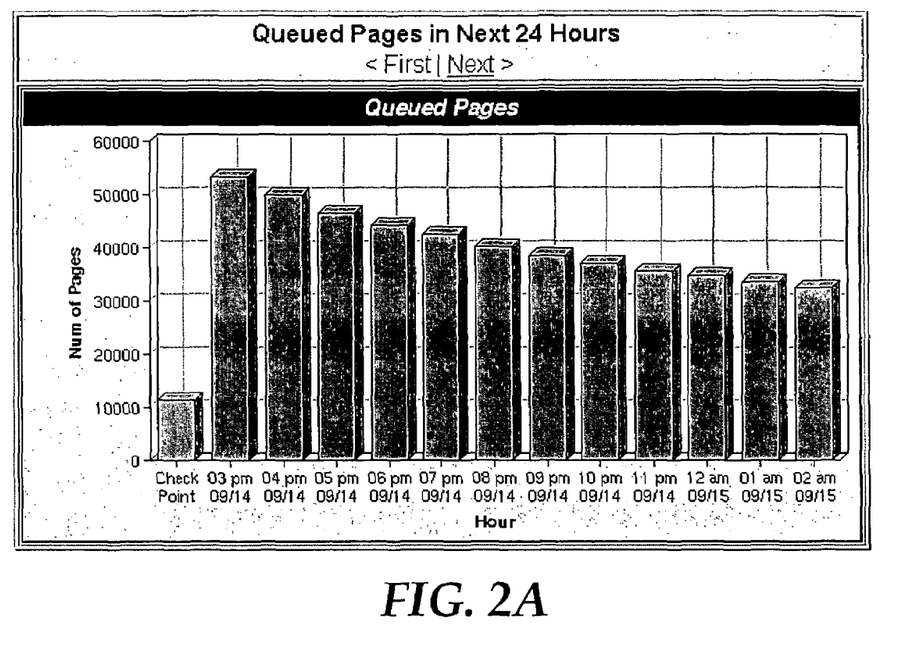
FIG. 2A is a diagram that illustrates an example prediction of future workload of a web crawler in the form of a graph depicting the number of queued pages in the next 24 hours, according to an embodiment of the invention.
Figure 2B:
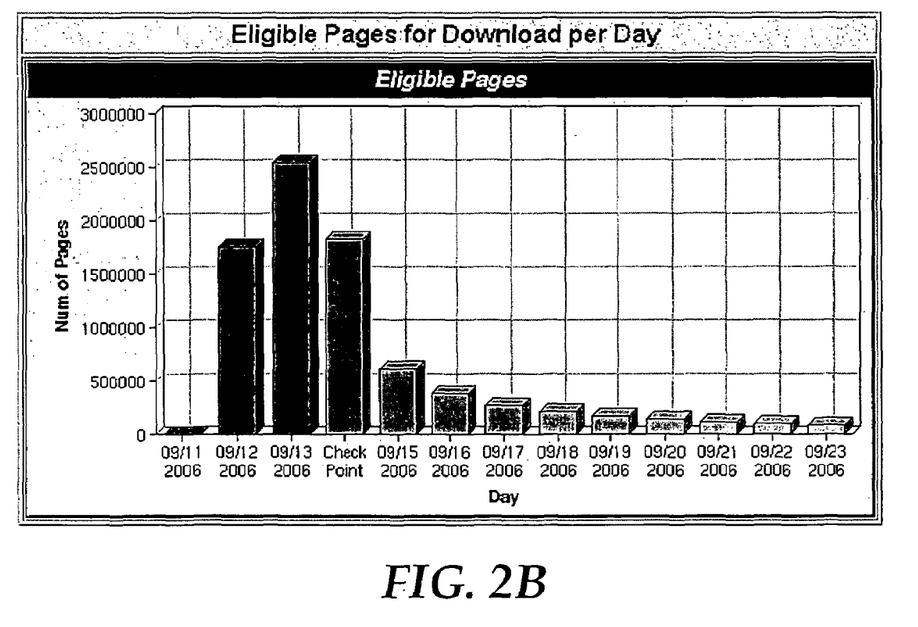
FIG. 2B is a diagram that illustrates an example prediction of future workload of a web crawler in the form of a graph depicting the number of eligible pages for download per day over a span of days, according to an embodiment of the invention.

The scheduling sub-system described herein (i.e., scheduler 106 operating with consideration to one or more host-based constraints 112 and/or item-based constraint 114) allows web crawler 102 to be, for non-limiting examples:

(1) Dynamically Constrained, where the scheduling requirements and constraints can be dynamically set on a running system (e.g., web pages' refresh rates changing in response to user-reconfiguration, or refresh rates computed per-page by a computer program);

(2) Forward Scheduled, where the scheduling decision as to when to refresh a searchable item is made immediately after the item is downloaded, so the behavior of the system with respect to when future refreshes will be attempted can be predicted well in advance;

(3) Operational with Ad-hoc Workloads, where the scheduling decision is made without knowing the size of the workload in the future, e.g., while not knowing precisely how many searchable items are contained within the host, the host speed, or even how long the download of a particular item might take; and (4) Featured with Advanced Reporting and Prediction, because the crawler is forward scheduled, future crawler behavior can be predicted in advance, thereby enabling advanced reporting capabilities. Examples of advanced reporting and predication features are illustrated in FIGS. 2A and 2B. FIG. 2A is a diagram that illustrates an example prediction of future workload of a web crawler in the form of a graph depicting the number of queued pages in the next 24 hours, according to an embodiment of the invention. FIG. 2B is a diagram that illustrates a example prediction of future workload of a web crawler in the form of a graph depicting the number of eligible pages for download per day over a span of days, according to an embodiment of the invention.

Figure 3:
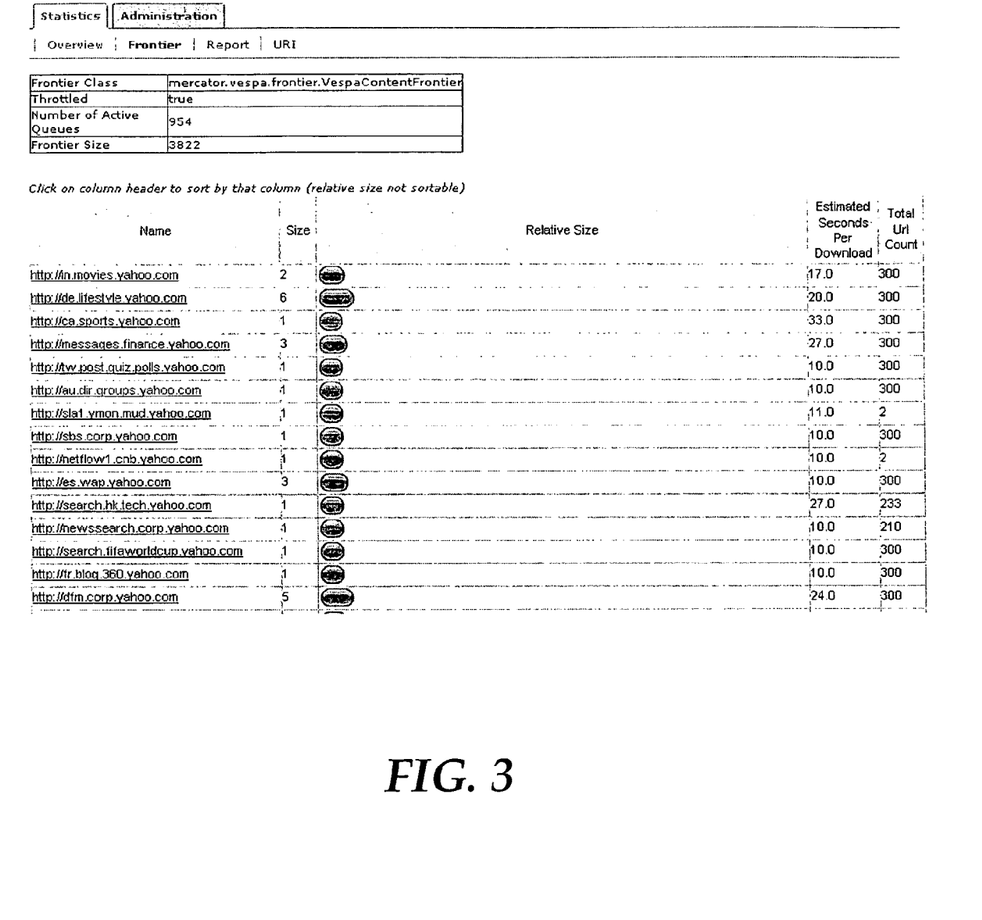
FIG. 3 is a diagram that illustrates a screenshot of a real-time interface to a crawler's per-host queues, depicting an example of what the crawler is doing at a particular point in time, according to an embodiment of the invention.

According to an embodiment, advanced reporting capabilities are provided through a real-time interface to the crawler's per-host queues, which displays dynamic queue sizes, host URI counts, and estimates of the current speed of each host and/or estimated download speeds for items from the host. FIG. 3 is a diagram that illustrates a screenshot of a real-time interface to a crawler's per-host queues, depicting an example of what the crawler is doing at a particular point in time, according to an embodiment of the invention. Together, the various reports illustrated in FIG. 2A, FIG. 2B, and FIG. 3 comprise a very complete view of what the crawler is working on right now as well as what the crawler will be working on in the future. This detailed information can also be used to predict when the system is reaching capacity, or is over capacity, and will not be able to meet freshness targets because of resource limitations.

The various techniques described herein result in better overall web crawler system throughput, higher effective capacity in the ability to satisfy more restrictive constraints on the same hardware, and more control over the aggregate web crawler behavior for a given corpus. Dynamically assignable scheduling classes, with associated freshness targets, enable a new class of web crawler applications that are capable of fine-grained control over the refresh rates of specific web pages and other searchable items. Consequently, a web crawler (e.g., web crawler 102 of FIG. 1) can perform prioritized crawling of sites so that certain "hot" pages are refreshed far more often compared to "cold" pages. For example, video search implementations could crawl video hub pages, which have frequently changing content, much faster compared to pages that host the videos themselves. For another example, assuming one knows that a particular page results in a pop-up window using a pop-up window detector, the web crawler 102 could correspondingly change the scheduling priority of that page.

A Method for Scheduling Searchable Items for Crawling

Figure 4:
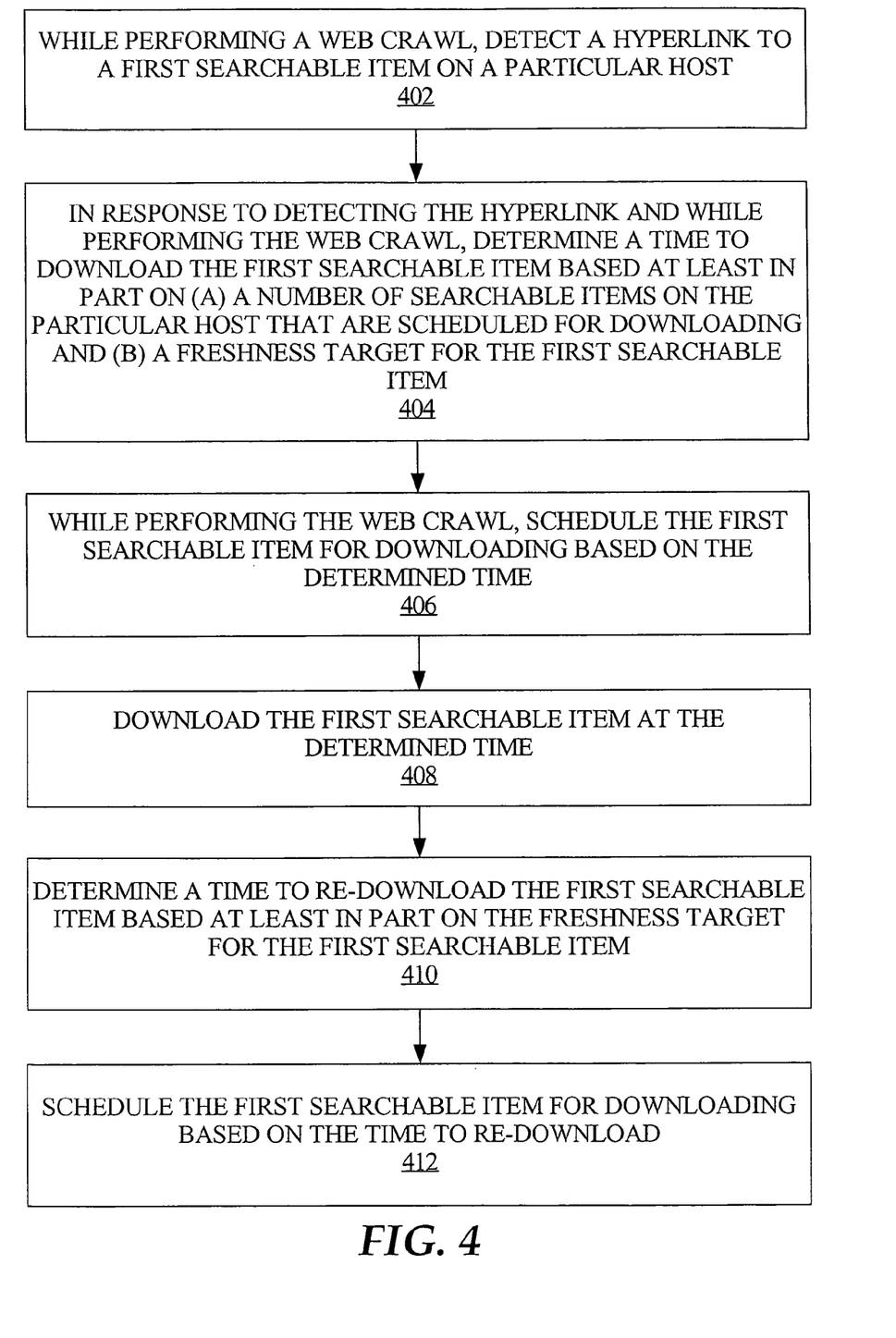
FIG. 4 is a flow diagram that illustrates a method for scheduling a searchable item for crawling, according to an embodiment of the invention.

FIG. 4 is a flow diagram that illustrates a method for scheduling a searchable item for crawling, according to an embodiment of the invention. The method depicted in FIG. 4 is a computer and/or machine-implemented method in which a computer or machine performs the method, such as by one or more processors executing instructions. For example, the method may be performed on or by a computer system such as computer system 600 of FIG. 6.

At block 402, while performing a web crawl, a hyperlink is detected to a first searchable item on a particular host. As discussed, web crawling involves locating and downloading searchable items and recording hyperlinks contained within the downloaded items so that the searchable items located via the hyperlinks can be crawled. For example, downloader 104 (FIG. 1) downloads searchable item 110*a* (FIG. 1) from host 110 (FIG. 1) via network 108 (FIG. 1), and finds a newly discovered link to searchable item 110*b* contained in searchable item 110*a*.

However, at block 404, in response to detecting the hyperlink, a time at which to download (referred to as the "download time") the first searchable item is determined, i.e., the first searchable item is scheduled for download. The download time is determined based at least in part on a number of searchable items on the particular host that are already scheduled for download (referred to as the "current size"), and a freshness target for the first searchable item. Continuing with the example, scheduler 106 (FIG. 1) computes a download time for searchable item 110*b* (FIG. 1) based on the current size of the corpus for host 110 (FIG. 1) and on the freshness target for searchable item 110*b* from item-based constraints 114 (FIG. 1), and places searchable item 110*b* appropriately along the timeline of crawler download queue 116.

Let R refer to how far into the future a searchable item is scheduled for download, i.e., the higher R is for a given item, the further into the future the item is scheduled for download. According to an embodiment, the larger the freshness target (specified in some units of time) for a given item, the higher R is for that item. Generally, this means that a given item with a relatively higher freshness target than another item can be safely pushed into the future farther than the other item, which needs to be downloaded sooner than the given item to meet the other item's freshness target. According to an embodiment, the larger the current size for a given item's host, the higher R is for that item. This means that a given item whose link is detected after the link for another item from the same host can, independent of the items' respective freshness targets, be safely pushed into the future farther than the other item. This is because, generally, the countdown to the later-discovered item's freshness target begins later than the countdown for the earlier-discovered item's freshness target, and more of the corpus is known about as the host's current size increases and there are fewer additional items from the same host to anticipate and plan for in the scheduling process. Thus, a given item whose link is detected on a given host at time $t_1$ before detection of the link for another item from a different host at time $t_2$, where the current size for the given item's host is greater than for the other item's host, can be safely pushed into the future farther than the other item even though the given item was detected before the other item.

According to an embodiment, at block 404, the download time for the first searchable item is determined based at least in part on the current size relative to the maximum number of searchable items on the particular host that are to be scheduled for downloading (referred to as the "maximum size"), and the freshness target for the first searchable item. According to an embodiment, the larger the proportion of the current size to the maximum size, the higher R is. As above, this is also because of the freshness target countdown start time and the knowledge about the host corpus, where the knowledge about the host corpus now includes more concrete knowledge about how many additional searchable items may need to be scheduled before the maximum size is reached. Thus, a given item whose link is detected on a given host at time $t_1$ before detection of the link for another item from a different host at time $t_2$, where the proportion of current size to maximum size for the given item's host is greater than for the other item's host, can be safely pushed into the future farther than the other item even though the given item was detected before the other item. Dynamic consideration, by scheduler 106 (FIG. 1), of the ratio of the current size to the maximum size for a given searchable item's host, in conjunction with the freshness target for the given item, provides an optimizing scheduling function that complies with such constraints while performing a download schedule distribution that maximizes overall throughput of the crawler system over multiple hosts and multiple scheduling classes, as represented by corresponding freshness targets.

At block 406, the first searchable item is scheduled for download based on the download time determined at block 404. Continuing with the example, scheduler 106 (FIG. 1) places searchable item 110*b* (FIG. 1) appropriately along the timeline of crawler download queue 116 (FIG. 1). According to an embodiment, a searchable item is queued for downloading by associating a timestamp with the item. The timestamp may not be an absolute real time, rather the timestamp represents the item's relative position in the download queue 116, where sufficient margin is maintained between "consecutive" timestamps so that later-discovered items can be placed between consecutive timestamps if necessary, e.g., to "squeeze" a new link between two existing scheduled links.

With past approaches, it is not determinable with a reasonable degree of precision or accuracy when a particular item would be crawled, and it is not easy to adapt to time constraints . Based on the foregoing description, one non-limiting practical application of the method embodied in blocks 402-406 is that hyperlinks that are discovered during a web crawling process are, in real-time, scheduled for downloading at a future time by a web crawler 102 (FIG. 1). For example, the crawler download queue 116, which embodies the download schedule, is a useful, concrete, and tangible result of the method illustrated in FIG. 4, in that download requests are queued and eventually submitted to the respective hosts 110*a*, 110*b*-110*n* (FIG. 1) by the downloader 104 (FIG. 1). From this web crawling process, a vast number of searchable items are indexed, whereby such items can be located by the public through use of an associated search engine for which the items are indexed. Furthermore, the future and current workload of the web crawler 102 can be displayed and viewed, for non-limiting examples, through the graphs illustrated in FIGS. 2A and 2B and the interface illustrated in FIG. 3.

According to an embodiment, the method depicted by blocks 402-406 is extended to include blocks 408-412 of FIG. 4. At block 408, the first searchable item is downloaded based on the time determined and scheduled at blocks 404-406.

Continuing with the example, downloader 104 (FIG. 1) of web crawler 102 (FIG. 1) downloads searchable item 110b from host 110 (FIG. 1) at a time based on its placement by scheduler 106 (FIG. 1) along the timeline of crawler download queue 116 (FIG. 1).

At block 410, a time to re-download the first searchable item is determined, based at least in part on the freshness target for the first searchable item. Of course, other factors may be considered in determining the re-download time for the item, such as the processing capabilities of the relevant host (e.g., CPU type, CPU speed, memory size, bus speed, etc.) and/or host-based constraints like the politeness factor corresponding to the relevant host or the current size or the maximum size for the host. At block 412, the first searchable item is scheduled for downloading based on the time to re-download determined at block 410. Continuing with the example, scheduler 106 (FIG. 1) again places searchable item 110b (FIG. 1) appropriately along the timeline of crawler download queue 116 (FIG. 1), for re-downloading searchable item 110b at a future time in order to refresh the item for the search engine, e.g., to extract and re-index the current content of searchable item 110b.

A Method for Managing a Web Crawler System

Figure 5:
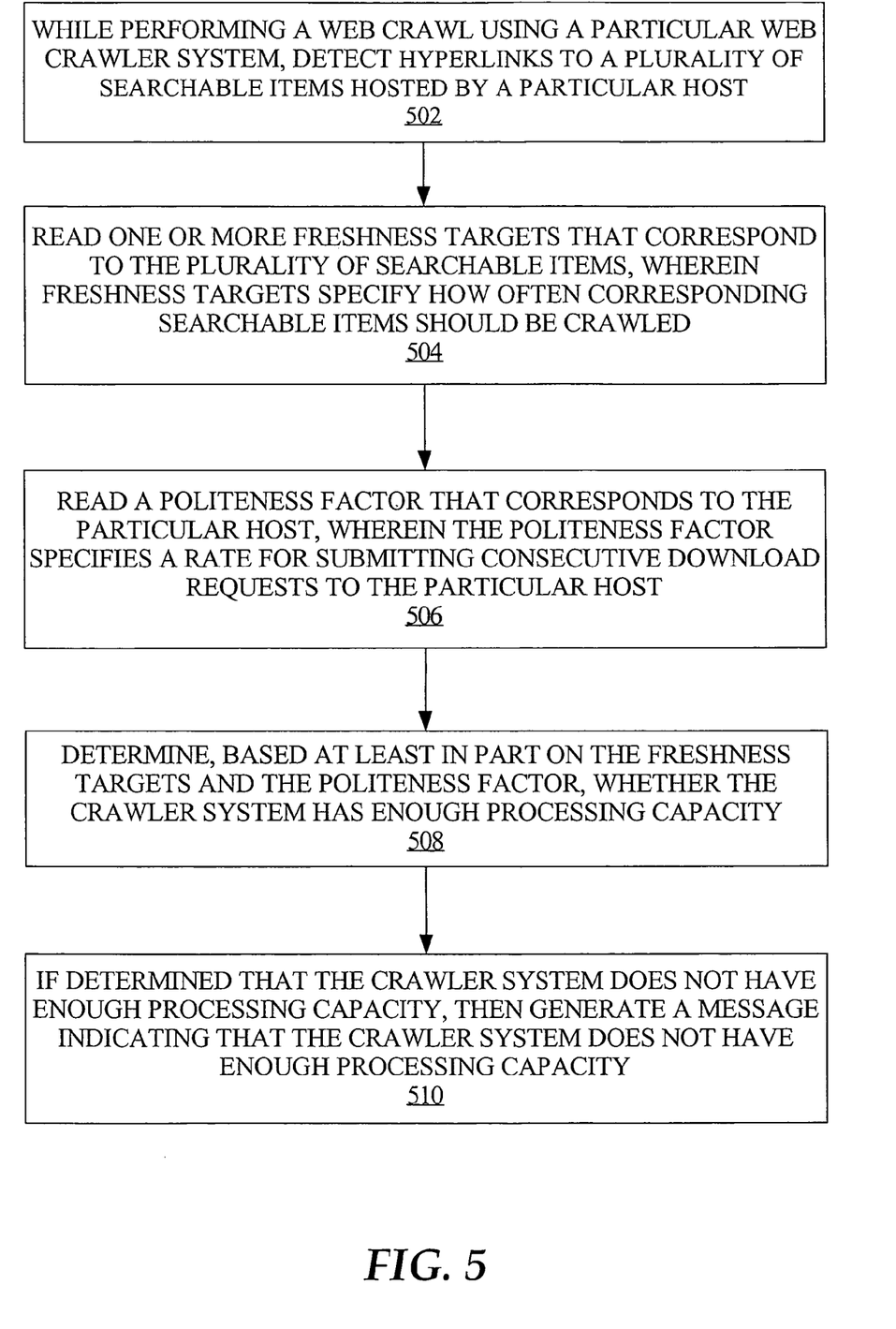
FIG. 5 is a flow diagram that illustrates a method for managing a web crawler system, according to an embodiment of the invention.

FIG. 5 is a flow diagram that illustrates a method for managing a web crawler system, according to an embodiment of the invention. The method depicted in FIG. 5 is a computer and/or machine-implemented method in which a computer or machine performs the method, such as by one or more processors executing instructions. For example, the method may be performed on or by a computer system such as computer system 600 of FIG. 6. The method of FIG. 5 generally reflects the forward-looking, predictive nature of the scheduling techniques described herein.

At block 502, while performing a web crawl using a particular web crawler system, detect hyperlinks to a plurality of searchable items hosted by a particular host. As discussed, web crawling involves locating and downloading searchable items and recording hyperlinks contained within the downloaded items so that the searchable items located via the hyperlinks can be crawled. For example, downloader 104 (FIG. 1) downloads searchable item 110a (FIG. 1) from host 110 (FIG. 1) via network 108 (FIG. 1), and finds newly discovered links to searchable item 110b-110n contained in searchable item 110a.

At block 504, read one or more freshness targets that correspond to the plurality of searchable items. As discussed, freshness targets specify how often corresponding searchable items should be crawled. A freshness target may be associated with an entire scheduling class of searchable items and may vary from item to item on a given host. Thus, freshness targets are considered item-based constraints, such as item-based constraints 114 (FIG. 1).

At block 506, read a politeness factor that corresponds to the particular host. As discussed, politeness factors specify a rate for submitting consecutive download requests to a particular host, i.e., how much time should pass between consecutive downloads from a given host. Politeness factors are considered host-based constraints, such as host-based constraints 112 (FIG. 1).

At block 508, based at least in part of the freshness targets and the politeness factor, determine whether the particular crawler system has enough processing capacity to crawl the plurality of searchable items in compliance with the freshness targets and the politeness factor. For example, based on forward looking graphs such as those depicted in FIGS. 2A and 2B, where the crawler download schedule information depicted was generated by taking into account the freshness targets and the politeness factor, it is determinable whether the corresponding crawler system is computationally powerful enough to keep up with the depicted schedule.

At block 510, if it was determined at block 508 that the crawler system does not have enough processing capacity to keep up with the download schedule required to comply with the freshness targets and the politeness factor, then generate a message indicating that the crawler system does not have enough capacity. The form which such an "under capacity" message takes may vary from implementation to implementation. For non-limiting examples, the message could be exposed and externalized through a user interface or could simply be a message that is internal to the crawler system to trigger an event or some remedial action.

Hardware Overview

Figure 6:
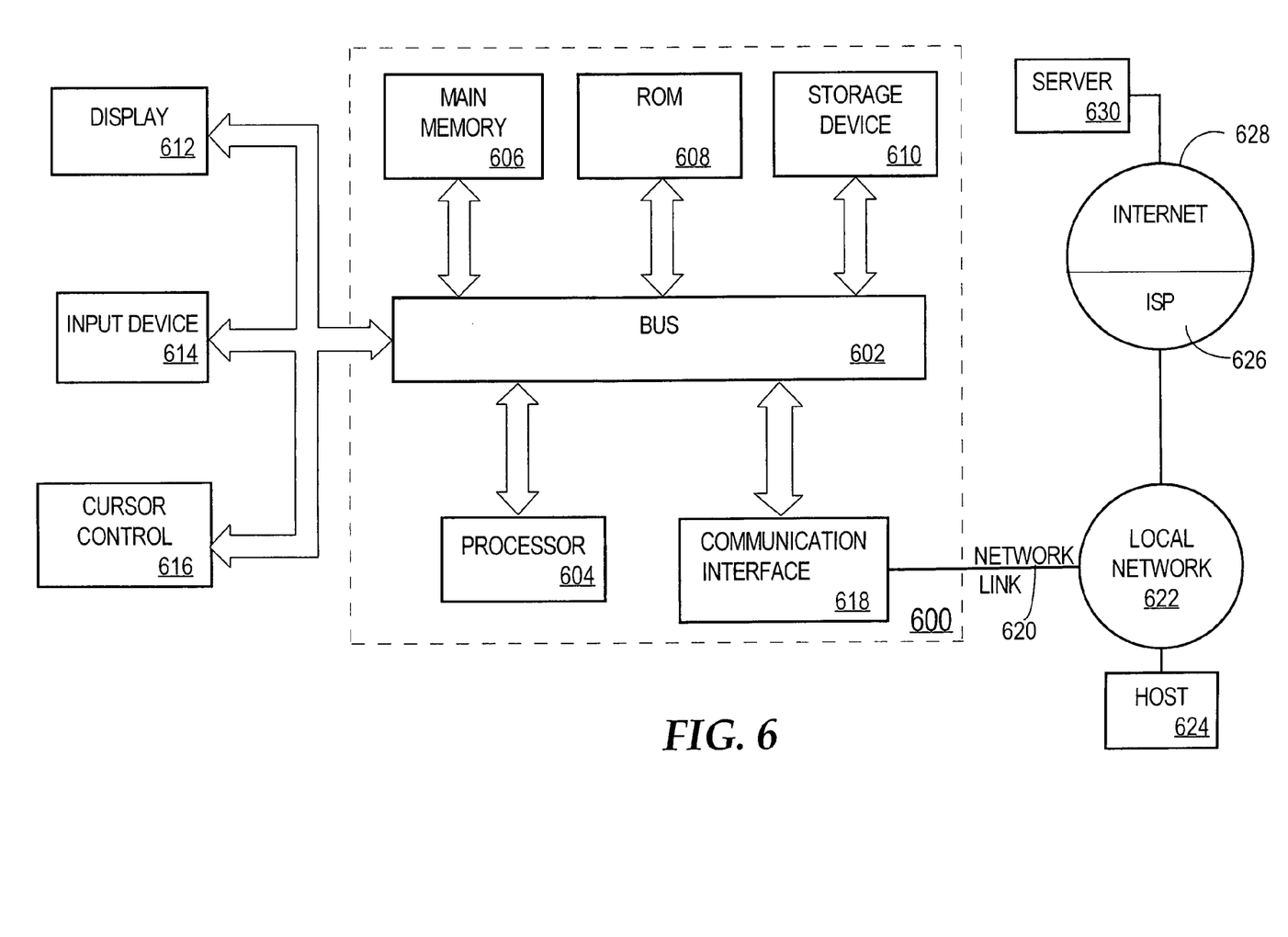
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to an embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic or magneto-optical disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be a digital subscriber line (DSL), cable, or integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Alternative embodiments of the invention are described throughout the foregoing specification, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Hence, embodiments of the invention can be generalized across many dimensions. For example, the techniques may be applied to other problem domains, such as for CPU scheduling in a realtime-scheduled system, or for scheduling the periodic backups of a network of machines that must be completed over and within a certain period of time. For another example, the techniques may be applied to other constraint types, such as for use in scheduling where the constraint is not time-related, e.g., for estimating how to store data coming from many inbound streams such as in a backup server. Here, the constraint could be that at least half of each data stream must stored, and the scheduler could be used to determine which stream to sample next as data becomes available, subject to the availability of the disk resource. For yet another example, the techniques may be applied to other versions of the problem where more information is known, i.e., because the scheduler can handle situations where the scheduling constraints are dynamic, the scheduler can certainly handle situations where the constraints are static. Likewise, because the scheduler can handle situations where the workload is not known, the scheduler can also handle situations where the workload composition is known well in advance.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising the steps of:
    while performing a web crawl,
        detecting a newly discovered hyperlink to a first searchable item on a particular host,
        in response to detecting said hyperlink, scheduling said first searchable item for downloading by placing said hyperlink to said first searchable item in a download queue based at least in part on (a) a number of other searchable items on said particular host that are scheduled for downloading and (b) a freshness target for said first searchable item;
        wherein, after said hyperlink to said first searchable item is placed in said download queue, the download queue includes a plurality of hyperlinks to a plurality of searchable items that includes said first searchable item;
        after placing said hyperlink to said first searchable item in said download queue, detecting a newly discovered hyperlink to a second searchable item on said particular host, wherein the second searchable item is different than the first searchable item;
        in response to detecting said hyperlink to said second searchable item, scheduling said second searchable item for downloading by placing said hyperlink to said second searchable item in said download queue based at least in part on (a) a second number of searchable items on said particular host that are scheduled for downloading and (b) a freshness target for said second searchable item;
        wherein said hyperlink to said second searchable item is at a position in said download queue that is before said hyperlink to said first searchable item in said download queue;
        wherein, based on the positions of said hyperlinks to said first and second searchable items in said download queue, said second searchable item will be downloaded before said first searchable item;
        prior to downloading said first and second searchable items, determining, based on the positions of said hyperlinks to said first and second searchable items in said download queue, a time at which said first searchable item is scheduled to be downloaded and a time at which said second searchable item is scheduled to be downloaded;
    wherein the steps are performed by one or more computing devices.

2. The method of claim 1, wherein:
    placing said hyperlink to said first searchable item in said download queue is further based on said number of searchable items on said particular host that are scheduled for downloading relative to a maximum number of searchable items on said particular host that are to be scheduled for downloading; and
    said searchable items on said particular host include searchable items other than said first searchable item.

3. The method of claim 1, wherein said freshness target for said second searchable item is different than said freshness target for said first searchable item.

4. The method of claim 1, wherein:
    placing said hyperlink to said second searchable item in said download queue is further based on said second number of searchable items on said particular host that are scheduled for downloading relative to a maximum number of searchable items on said particular host that are to be scheduled for downloading; and
    said searchable items on said particular host include searchable items other than said first and second searchable items.

5. The method of claim 1, where said particular host is a first host, the method further comprising:
    while performing said web crawl,
        detecting a hyperlink to a third searchable item on a second host, which is a different host from said first host, after detecting said hyperlink to said first searchable item on said first host,
        in response to detecting said hyperlink to said third searchable item, scheduling said third searchable item for downloading by placing said hyperlink to said third searchable item in a second download queue based at least in part on (a) a number of other searchable items on said second host that are scheduled for downloading and (b) a freshness target for said third searchable item; and
        wherein a time to download said third searchable item is before a time to download said first searchable item.

6. The method of claim 5, further comprising:
    downloading said first and third searchable items using shared resources used to crawl a plurality of hosts.

7. The method of claim 5, wherein:
    placing said hyperlink to said third searchable item in said second download queue is further based on said number of searchable items on said second host that are scheduled for downloading relative to a maximum number of searchable items on said second host that are to be scheduled for downloading; and
    said searchable items on said second host include searchable items other than said third searchable item.

8. The method of claim 1, wherein:
    placing said hyperlink to said first searchable item in said download queue is further based on processing capabilities of said particular host; and
    the processing capabilities of said particular host comprise at least one of the set consisting of the CPU type of said particular host, the CPU speed of said particular host, the memory size of said particular host, and the bus speed of said particular host.

9. The method of claim 1, wherein said scheduling comprises scheduling said first searchable item for downloading by placing said hyperlink to said first searchable item in said download queue is further based on a politeness factor that specifies a delay between consecutive download requests submitted to said particular host.

10. The method of claim 1, further comprising:
    downloading said first searchable item;
    scheduling said first searchable item for re-downloading by again placing said hyperlink to said first searchable item in said download item based at least in part on said freshness target for said first searchable item.

11. The method of claim 10, wherein:
    again placing said hyperlink to said first searchable item in said download queue is further based on processing capabilities of said particular host; and
    the processing capabilities of said particular host comprise at least one of the set consisting of the CPU type of said particular host, the CPU speed of said particular host, the memory size of said particular host, and the bus speed of said particular host.

12. The method of claim 1, further comprising:
    while performing a second web crawl using a particular crawler system,
        detecting hyperlinks to a second plurality of searchable items hosted by a second particular host, reading one or more freshness targets that correspond to said second plurality of searchable items, wherein each of the one or more freshness target specifies how often a corresponding searchable item should be crawled, reading a politeness factor that corresponds to said second particular host, wherein said politeness factor specifies a rate for submitting consecutive download requests to said second particular host, determining, based at least in part on said one or more freshness targets and said politeness factor, whether said particular crawler system has enough processing capacity to crawl said second plurality of searchable items in compliance with said freshness targets and said politeness factor; and if it is determined that said particular crawler system does not have enough processing capacity to crawl said second plurality of searchable items in compliance with said freshness targets and said politeness factor, then generating a message indicating that said particular crawler system does not have enough processing capacity.

13. The method of claim 12, further comprising:
causing a graphical display of a number of searchable items queued for downloading per hour for a certain number of hours in the future.

14. The method of claim 12, said certain steps comprising:
causing display of a current operational status of said particular crawler system, wherein said operational status includes a particular number of searchable items queued for downloading for each of one or more hosts.

15. The method of claim 14, wherein said operational status includes an estimated time per download for said searchable items for each of said one or more hosts.

16. The method of claim 1, wherein:
when said hyperlink is detected, said first searchable item has never been downloaded by a particular crawling system that is performing the web crawl.

17. One or more non-transitory storage media storing instructions which, when executed by one or more processors, cause performance of the steps recited in claim 1.

18. One or more non-transitory storage media storing instructions which, when executed by one or more processors, cause performance of the steps recited in claim 12.

19. One or more non-transitory storage media storing instructions which, when executed by one or more processors, cause performance of the steps recited in claim 16.

20. The method of claim 1, wherein:
said download queue is a first download queue;
said first download queue is limited to including hyperlinks to searchable items that are only from said particular host;
the method further comprising:
detecting a newly discovered hyperlink to a third searchable item on a second host that is different than said particular host;
in response to detecting said hyperlink to said third searchable item, scheduling said third searchable item for downloading by placing said hyperlink to said third searchable item in a second download queue based at least in part on (a) a number of other searchable items on said second host that are scheduled for downloading and (b) a freshness target for said third searchable item;
said second download queue is different than said first download queue;
said second download queue is limited to including hyperlinks to searchable items that are only from said second host.

21. One or more non-transitory storage media storing instructions which, when executed by one or more processors, cause performance of the steps recited in claim 20.

22. One or more non-transitory storage media storing instructions which, when executed by one or more processors, cause performance of the steps recited in claim 2.

23. One or more non-transitory storage media storing instructions which, when executed by one or more processors, cause performance of the steps recited in claim 3.

24. One or more non-transitory storage media storing instructions which, when executed by one or more processors, cause performance of the steps recited in claim 4.

25. One or more non-transitory storage media storing instructions which, when executed by one or more processors, cause performance of the steps recited in claim 5.

26. One or more non-transitory storage media storing instructions which, when executed by one or more processors, cause performance of the steps recited in claim 6.

27. One or more non-transitory storage media storing instructions which, when executed by one or more processors, cause performance of the steps recited in claim 7.

28. One or more non-transitory storage media storing instructions which, when executed by one or more processors, cause performance of the steps recited in claim 8.

29. One or more non-transitory storage media storing instructions which, when executed by one or more processors, cause performance of the steps recited in claim 9.

30. One or more non-transitory storage media storing instructions which, when executed by one or more processors, cause performance of the steps recited in claim 10.

31. One or more non-transitory storage media storing instructions which, when executed by one or more processors, cause performance of the steps recited in claim 11.

32. One or more non-transitory storage media storing instructions which, when executed by one or more processors, cause performance of the steps recited in claim 13.

33. One or more non-transitory storage media storing instructions which, when executed by one or more processors, cause performance of the steps recited in claim 14.

34. One or more non-transitory storage media storing instructions which, when executed by one or more processors, cause performance of the steps recited in claim 15.

* * * * *